UNITED STATES PATENT OFFICE.

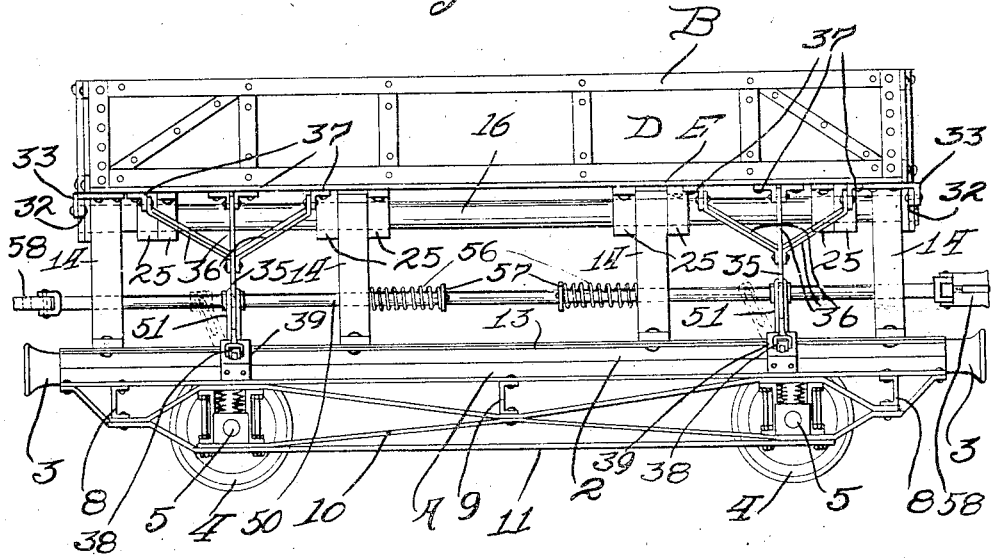

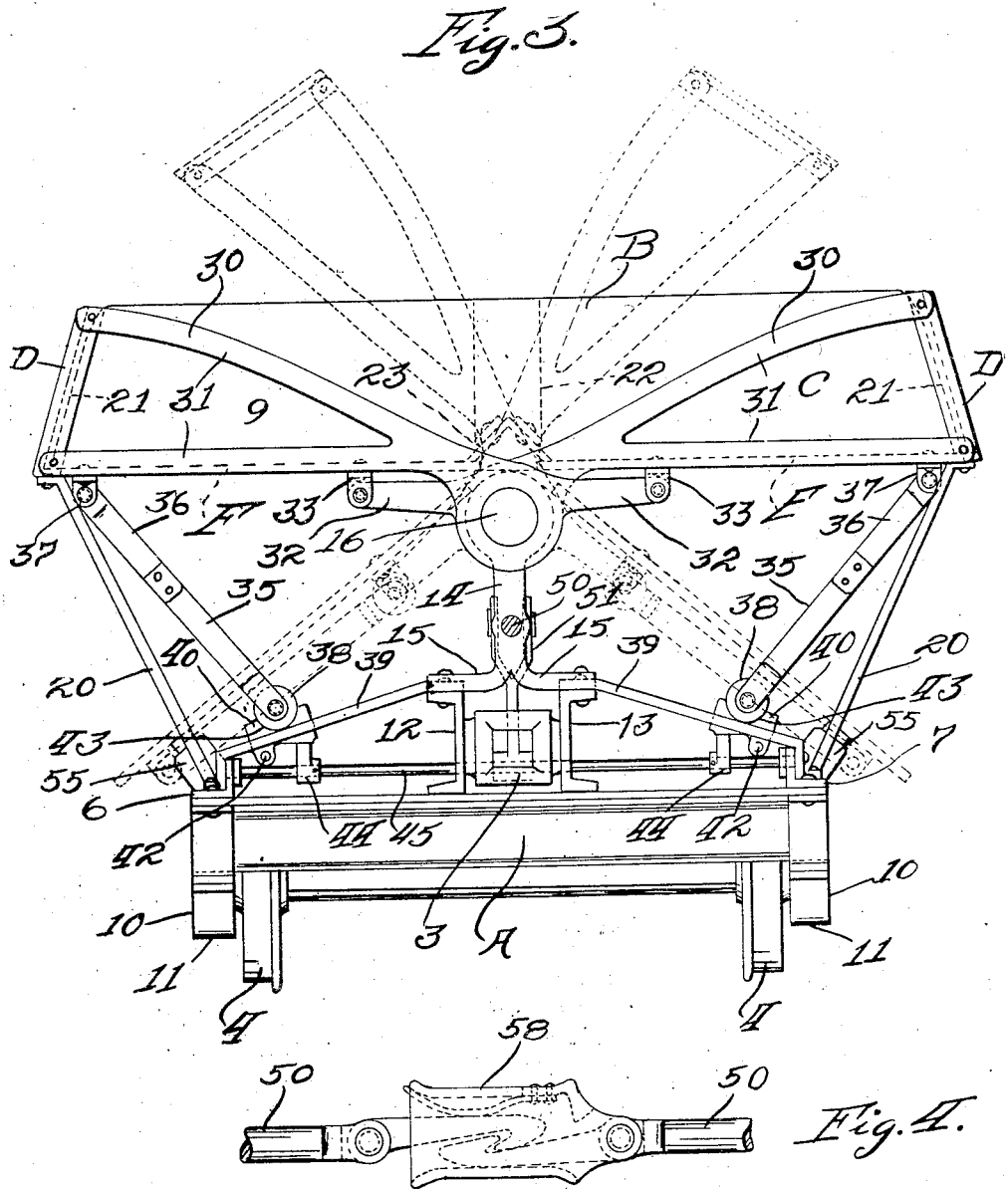

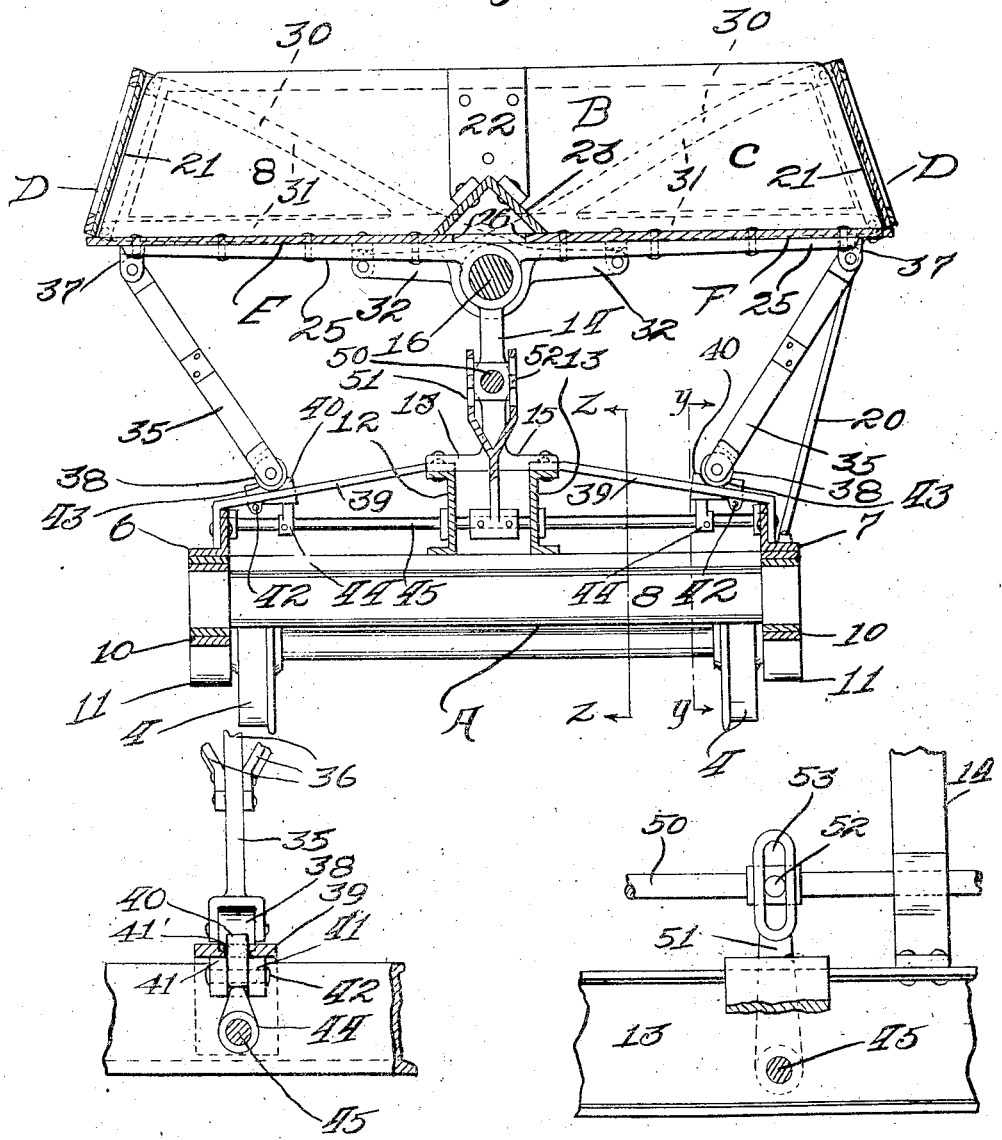

LOUIS A. WELSCH, OF ST. PAUL, MINNESOTA.

AUTOMATIC DUMP-VEHICLE.

1,164,604.

Specification of Letters Patent.   Patented Dec. 14, 1915.

Application filed January 4, 1915.  Serial No. 390.

*To all whom it may concern:*

Be it known that I, LOUIS A. WELSCH, a citizen of the United States, residing at St. Paul, in the county of Ramsey and State of Minnesota, have invented a new and useful Improvement in Automatic Dump-Vehicles, of which the following is a specification.

The object of this invention is the production of a simple, efficient and inexpensive dump vehicle, which will easily and quickly dump the contents thereof cleanly, and automatically close again after the dumping operation.

More particularly the invention is applicable to railway cars, although the principles and construction employed may be applied to motor vehicles and other classes of conveyers.

A further object is the production of means, whereby a series of vehicles employing my invention can be coupled and operated simultaneously to dump the contents of all, and lock the devices after they have closed automatically, so that they cannot be again opened unintentionally.

The invention also provides a simple and strong construction, which is not liable to get out of order, or become inoperative during the use of the invention.

To these ends my invention comprises the features of construction and combination of parts hereinafter more particularly described and set forth in the claims.

In the drawings, Figure 1 is a side elevation; Fig. 2 is a plan; Fig. 3 is an end view; Figs. 4 and 5 are plans of the coupling, which is employed for coupling the operating mechanism of adjacent vehicles; Fig. 6 is a section on the line X—X, Fig. 2; Fig. 7 is a partial section of a detail on the line Y—Y, Fig. 6, looking in the direction of the arrow, and Fig. 8 is another partial section on the line Z—Z, Fig. 6 looking in the direction of the arrow.

In the drawings, A indicates the running gear of a car, such as is employed on railroads for holding gravel, earth or any other material. The running gear disclosed is in the form of a truck, having the usual frame work 2, couplings 3, truck wheels 4, and journals 5, said frame being of rectangular shape, having the usual side pieces 6 and 7, and cross pieces 8 and 9. The side pieces 6 and 7 of said frame are made of angle beams bolted or otherwise secured to the cross pieces 8 and 9, said frame being suitably reinforced to assist in forming a strong and rigid structure, to which the side braces 10 and longitudinal truss rods 11 are secured. Fastened near the longitudinal center line of said frame are two channel beams 12 and 13, which are spaced evenly apart and secured upon the cross pieces 8 and 9. These longitudinal channel beams carry near and between their ends upwardly projecting supports 14, each of which is in the form of a flat bar having its end portions bent together and spread to form flanges 15, which are secured to the channel beams 12 and 13. In these supports 14 a shaft 16 is held, which traverses the structure longitudinally and horizontally in a central vertical plane passing through the vehicle. This shaft carries a portion of the load of the body B, said body being composed of rigid ends C, upwardly movable sides D and downwardly swinging bottom or floor sections E and F.

The ends C are similar in construction, each consisting of a plate supported by downwardly and inwardly slanting arms 20 secured to said ends and to the angle side pieces 6 and 7, said plate having upwardly and inwardly slanting ends 21, over which the sides D close in slanting position. The median portion of the ends C are secured by flanged members 22 to an inverted angle bar 23, which parts serve to reinforce the strength of the structure, thus formed, and tie the ends together into a rigid unit. The bar 23 is disposed longitudinally and horizontally midway between the sides of the body and in addition to reinforcing the structure serves as a shield to protect the working parts below against the contents of the body clogging movable joints.

Hinged upon the shaft 16 are the floor sections E and F of the body, each of which is mounted to swing downwardly and inwardly from the shaft by hinge members 25. The inner edges 26 (see Fig. 6) of the floor sections project inwardly below the downwardly extending sides of the angle bar 23, so that there is no chance for the contents catching and jamming between the parts when the sections are swung down. The remaining edges of the bottom sections overlap the lower edges of the ends and sides.

The sides D of the body are in the form of plain sheets of material, reinforced by bracing and cross bracing and hinged from the shaft 16 by hinge elements 30, there being a pair for each side wall of the body secured outside of the body to its opposite ends on one side of the shaft. Each of said hinge elements has a pair of arms 31 extending outwardly on one side of the shaft and a single arm 32 extending outwardly from the other side of said shaft, said pair of arms being secured to the side wall by their ends and said single arm extending down and pivotally fastened to a bracket 33 on the under side of the adjacent floor section, so that as a side wall on one side of the shaft is raised, the floor section on the opposite side of said shaft is lowered simultaneously. The side and floor of each set mounted upon a pair of hinge elements acting by gravity together, cause the contents of the body to deposit downwardly when the body is emptied the sides D being supported in upwardly and inwardly slanting position when closed over the body. The outer ends of the floor sections are supported by lock arms 35, there being four shown, two disposed below each floor section. The upper end portion of each lock member 35 is formed with three arms 36, to brace and support the lock member longitudinally of the vehicle, the upper end of each arm being hinged by the hinge elements 37 to the floor section. The lower end of the lock element is provided with an anti-friction roller 38, bearing upon an upwardly and inwardly slanting guide 39, which is in the form of a flat bar secured by its ends to one of the main channel bars 12 or 13, and by its lower end to one of the side bars 6 or 7. As the floor sections swing down and up the lower end of the lock arms 35 travel upon the guides and when the floor sections E and F and sides D are in closed position, the arms 35 are locked by lock devices 40, and held so that the body cannot be opened unintentionally.

There is a lock element for each lock arm, consisting of a block which is secured between ears 41 formed on the lower surface of the guide 39 by means of a pivot connection 42, as shown, the block being adapted to work within a slot 41' provided in the guide. The upper surface of the block has a transverse channel or groove 43, which receives the antifriction roller 38 and holds it while the lock is in locking position. The opening 41 is narrower than the width of the face of the roller 38 and the roller consequently supports the load carried by the lock arm on the guide 39 free of the block. The free end of the block is held in locking position by a cam 44 mounted upon one of the shafts 45, which is journaled in the angle bars 6 and 7 and channel beams 12 and 13, there being two shafts upon which all of the cams are mounted. When the shafts are turned in either direction, the cams release the locks into unlocking position, permitting the arms 35 to turn up and the floor sections and sides to open.

For simultaneously moving the lock elements into and out of locking position, a shaft 50 is slidably mounted in the supports 14 and disposed longitudinally. This shaft is coupled to a crank arm 51 rigidly mounted on each of the shafts 45, by studs 52 working in grooves 53 in the free bifurcated end of said arm, whereby longitudinal movement of said shaft in either direction will swing said arms 51 and the shafts and cams 45 and 43. When the body is loaded and the shaft 50 moved into unlocking position the floor sections swing down and the sides turn up, thus releasing the load and emptying the body cleanly. Slanting the sides as shown permits this operation to transpire with little resistance. The leverage produced by the arms 31 and the weight of the sides more than counter-balances the load of the companion floor section, thus causing the side and the floor section which it counteracts to close automatically as soon as the load is released. When desired bumpers 55 can be placed on the angle bars 6 and 7 to absorb the jar of the floor sections when swinging down under load and stopping suddenly. The shaft 50 after being moved into unlocking position in either forward or backward direction is returned into median position to make the lock elements 40 engage and hold the rollers 38, by means of compression springs 56, which press by their ends against the supports 14 and against washers or collars 57 fastened to the shaft 50.

The shaft 50 can be operated by attaching a locomotive or other power to either of its ends, the construction shown being adapted for coupling a number of cars and a locomotive together and dumping the contents of all of the cars and relocking them at the same time. For this purpose the ends of the shaft 50 are provided with automatic couplers 58 of any well known form. In Figs. 4 and 5, the ends of adjacent shafts of adjacent cars are shown coupled together.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claims.

Having described my invention, what I claim as new and desire to protect by Letters Patent is:—

1. A vehicle of the class set forth, comprising, in combination, a truck, a body having an upwardly tiltable side and a downwardly tiltable bottom, a member pivotally mounted intermediate its length upon said truck, said member being connected at one extremity to said side and at its other extremity to said bottom to cause simultaneous movement of said side and bottom, and means for locking said side and bottom in closed position.

2. A vehicle of the class set forth, comprising, in combination, a truck, a body carried by said truck having a pair of upwardly tiltable sides and downwardly tiltable bottom sections, rigid members pivotally mounted intermediate their ends upon said truck, each of said members being connected at one extremity to one of said sides and at its other extremity to one of said bottom sections to cause simultaneous movement of said side and bottom sections in opposite directions, and means for locking said sides and bottom sections in closed position.

3. A vehicle of the class set forth, comprising, in combination, a truck, a body carried by said truck having a pair of upwardly tiltable side walls and downwardly tiltable bottom sections, the wall on one side of said body and the bottom section on the opposite side being connected to move simultaneously and hinged to swing up and down, said side walls being adapted to swing upwardly while said bottom sections swing downwardly into open position, and means for locking said parts in closed position.

4. A vehicle of the class set forth, comprising, in combination, a truck, a body carried by said truck having a pair of upwardly tiltable side walls and downwardly tiltable floor sections, a shaft carried by said truck longitudinally of said vehicle, said side walls and floor sections being hinged upon said shaft and the wall on one side of the body being operatively connected to the floor section on the opposite side of the vehicle and the weight of each floor section being over-balanced by the weight of the side wall carried on the opposite side of the body, whereby the floor sections and side walls tend to swing into closed position automatically, and means for locking said side walls and floor sections closed.

5. A vehicle of the class set forth, comprising, in combination, a truck, a body carried by said truck having a pair of upwardly tiltable side walls and a pair of downwardly tiltable floor sections, said side walls and floor sections being hingedly supported upon said truck and the wall on one side of the body being operatively connected to the floor section on the opposite side of the body and the weight of each floor section being over-balanced by the weight of the side wall carried on the opposite side of the body, whereby the floor sections and side walls tend to swing into closed position automatically, and means for locking said side walls and floor sections closed.

6. A vehicle of the class set forth, comprising, in combination, a truck, a body carried by said truck having a pair of upwardly tiltable side walls and a pair of downwardly tiltable floor sections, said side walls and floor sections being hinged upon said truck, the wall on one side of the body being operatively connected to the floor section on the opposite side of the body, the weight of each floor section being over-balanced by the weight of the side wall carried on the opposite side of the body, and said side walls being inclined upwardly and inwardly when in closed position to assist in forming a body receptacle, whereby the floor sections and side walls tend to swing into closed position automatically and said side walls are adapted when rising to free themselves from the load material in the body, and means for locking said side walls and floor sections closed.

7. A vehicle of the class set forth, comprising, in combination, a truck, a body carried by said truck having a pair of upwardly tiltable side walls and a pair of downwardly tiltable floor sections, a wall on each side of the body operatively connected with the floor section on the opposite side of the body, the connecting means between said side walls and floor sections being hinged upon said truck and the weight of the floor section being over-balanced by the weight of the companion side wall carried on the opposite side of the body, whereby the floor sections and side walls tend to swing into closed position automatically, lock arms hinged below said floor sections, means for guiding the lower ends of said arms to permit free movement of said connected side wall and floor section, lock elements adapted to engage the lower ends of said lock arms to hold said side walls and floor sections in closed position, and means for moving said lock elements into locking position.

8. A vehicle of the class set forth, comprising, in combination, a truck, a body carried by said truck having a pair of upwardly tiltable side walls and a pair of downwardly tiltable floor sections, a wall on each side of the body being operatively connected with the floor section on the opposite side of the body, the connecting means between said side walls and floor sections being hinged upon said truck and the weight of the floor section being over-balanced by the companion side wall carried on the opposite side of the body, whereby the floor sections and side walls tend to swing into closed position automatically, a shaft below said body movable longitudinally and means connected with said shaft for locking and unlocking by its movement the floor sections and sides when the latter are in closed position.

9. A vehicle of the class set forth, comprising, in combination, a truck, a body carried by said truck having a pair of upwardly tiltable side walls and a pair of downwardly tiltable floor sections, a wall on each side of the body being operatively connected with the floor section on the opposite side of the body, the connecting means between said connected side walls and floor sections being hinged upon said truck and the weight of the floor section being over-balanced by the weight of the companion side wall carried on the opposite side of the body, whereby the floor sections and side walls tend to swing into closed position automatically, a shaft mounted below said body and movable longitudinally, lock arms hinged below said floor sections and locking means between said shaft and lock arms for engaging and disengaging said arms to respectively lock and unlock said floor sections and side walls in closed or open position.

10. A vehicle of the class set forth, comprising, in combination, a truck, a body carried by said truck having a pair of upwardly tiltable side walls and a pair of downwardly tiltable floor sections, a wall on each side of the body being operatively connected with the floor section on the opposite side of the body, the connecting means between said side walls and floor sections being hinged above said truck and the weight of the floor section of each couple being over-balanced by the weight of the companion side wall carried on the opposite side of the body, whereby the floor sections and side walls tend to swing into closed position automatically, a shaft below said body movable longitudinally, means connected with said shaft for locking and unlocking the floor sections and side walls in closed or open position and means on the ends of said shaft for operatively coupling it to other shafts.

In testimony whereof, I have signed my name to this specification in the presence of two subscribing witnesses.

LOUIS A. WELSCH.

Witnesses:
STELLA L. WASCHENBERGER,
I. S. BRADBURY.